(12) United States Patent
Aaron et al.

(10) Patent No.: US 11,110,608 B2
(45) Date of Patent: Sep. 7, 2021

(54) ROBOTIC PHYSICAL MOVEMENT ADJUSTMENT BASED ON USER EMOTIONAL STATE

(71) Applicant: International Business Machines Corporation, Armonk, NY (US)

(72) Inventors: Andrew Aaron, Ardsley, NY (US); Hariklia Deligianni, Alpine, NJ (US); David O. S. Melville, New York City, NY (US); Mark E. Podlaseck, Kent, CT (US); Hyun Kyu Seo, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 15/858,400

(22) Filed: Dec. 29, 2017

(65) Prior Publication Data
US 2019/0202060 A1 Jul. 4, 2019

(51) Int. Cl.
*B25J 13/00* (2006.01)
*B25J 9/16* (2006.01)
*H04R 1/02* (2006.01)
*B25J 19/02* (2006.01)
*G10L 15/22* (2006.01)
*G10L 25/63* (2013.01)

(52) U.S. Cl.
CPC .............. *B25J 9/1697* (2013.01); *B25J 13/00* (2013.01); *B25J 19/026* (2013.01); *G10L 15/22* (2013.01); *H04R 1/028* (2013.01); *G10L 25/63* (2013.01)

(58) Field of Classification Search
CPC ........ B25J 9/1697; B25J 13/00; B25J 19/026; B25J 9/0084; B25J 5/007; B25J 11/009; G10L 15/22; G10L 25/63; H04R 1/028; G05D 1/0088; G05D 1/0274; G06N 3/008; H04W 4/70
See application file for complete search history.

(56) References Cited

U.S. PATENT DOCUMENTS

| | | | | |
|---|---|---|---|---|
| 6,278,904 B1 * | 8/2001 | Ishii | ......................... | G09F 21/04 |
| | | | | 114/278 |
| 7,171,286 B2 * | 1/2007 | Wang | .................. | G06F 19/3418 |
| | | | | 700/248 |
| 7,228,203 B2 * | 6/2007 | Koselka | ................... | B25J 5/007 |
| | | | | 318/568.12 |

(Continued)

OTHER PUBLICATIONS

Shibata et al., Subjective interpretation of emotional behavior through physical interaction between human and robot, 1999, IEEE, p. 1024-1029 (Year: 1999).*

(Continued)

*Primary Examiner* — McDieunel Marc
(74) *Attorney, Agent, or Firm* — Law Office of Jim Boice (57) ABSTRACT

A method controls a robot. One or more processors receive sensor readings from one or more sensors that are monitoring a human in real time, where the human is currently observing a robotic action by a robot, and where the robotic action is a physical movement performed by the robot. The processor(s) determine a cognitive state of the human while the human is observing the robotic action by the robot, and then adjust the robotic action being performed by the robot based on the cognitive state of the human.

19 Claims, 8 Drawing Sheets

(56) References Cited

U.S. PATENT DOCUMENTS

| | | | | |
|---|---|---|---|---|
| 7,577,498 | B2* | 8/2009 | Jennings | B25J 9/0084 |
| | | | | 141/100 |
| 7,584,020 | B2* | 9/2009 | Bruemmer | G06N 3/008 |
| | | | | 318/567 |
| 7,620,477 | B2* | 11/2009 | Bruemmer | G06N 3/008 |
| | | | | 180/167 |
| 7,668,621 | B2* | 2/2010 | Bruemmer | G05D 1/0088 |
| | | | | 318/568.12 |
| 8,209,051 | B2* | 6/2012 | Wang | B25J 5/007 |
| | | | | 318/568.11 |
| 8,265,793 | B2* | 9/2012 | Cross | H04W 4/70 |
| | | | | 700/259 |
| 9,069,356 | B2* | 6/2015 | Papaefstathiou | G05D 1/0274 |
| 9,314,928 | B2* | 4/2016 | Hyde | B25J 11/009 |
| 9,314,929 | B2* | 4/2016 | Hyde | B25J 11/009 |
| 10,099,379 | B2* | 10/2018 | Hyde | B25J 9/1697 |
| 2004/0210159 | A1 | 10/2004 | Kibar | |
| 2004/0249510 | A1* | 12/2004 | Hanson | G06F 19/00 |
| | | | | 700/245 |
| 2014/0347265 | A1 | 11/2014 | Aimone et al. | |
| 2015/0190927 | A1* | 7/2015 | Sutherland | H04W 4/70 |
| | | | | 700/259 |
| 2015/0302866 | A1 | 10/2015 | Sobol Shikler | |
| 2017/0352351 | A1* | 12/2017 | Kimura | B25J 11/001 |

OTHER PUBLICATIONS

Sarvadevabhatha et al. Extended duration human-robot interaction: Tools and analysis, 2010, IEEE, p. 7-14 (Year: 2010).*
Kanda et al., Development and evaluation of interactive humanoid robots, 2004, IEEE, p. 1839-1850 (Year: 2004).*
Sciutti et al., Understanding Object Weight from Human and Humanoid Lifting Actions, 2014, IEEE, p. 80-92 (Year: 2014).*
Gomi et al., Emulation of emotion using vision with learning, 1994, IEEE, p. 210-215 (Year: 1994).*
Xie et al., Intention-based coordination and interface design for human-robot cooperative search, 2011, IEEE, p. 3349-3354 (Year: 2011).*
Spexard et al., Human-Oriented Interaction With an Anthropomorphic Robot, 2007, IEEE, p. 852-862 (Year: 2007).*
Hoque et al., Proactive approach of making eye contact with the target human in multi-party settings, 2013, IEEE, p. 191-196 (Year: 2013).*
Sviestins et al., Speed Adaptation for a Robot Walking with a Human, 2007, IEEE, p. 349-356 (Year: 2007).*
Hara et al., Real-time Facial Interaction between Human and 3D Face Robot Agent, 1996, IEEE, p. 401-409 (Year: 1996).*
Cid et al., A Real Time and Robust Facial Expression Recognition and Imitation approach for Affective Human-Robot Interaction Using Gabor filtering, 2013, IEEE, p. 2188-2193 (Year: 2013).*
Pateraki et al., Tracking of facial features to support human-robot interaction, 2009, IEEE, p. (Year: 2009).*
Hara, Artificial Emotion of Face Robot through Learning in Communicative Interactions with Human, 2004, IEEE, p. 7-15 (Year: 2004).*
P. Mell et al., "The NIST Definition of Cloud Computing", National Institute of Standards and Technology, Information Technology Laboratory, Sep. 2011, pp. 1-7.
Cauchard et al., "Emotion Encoding in Human-Drone Interaction". IEEE Computer Society, ACM/IEEE International Conference on Human-Robot Interaction, Apr. 2016, Christchurch, NZ: pp. 263-270.
Madhumita Murgia, "Affective Computing: How 'Emotional Machines' Are About to Take Over Our Lives". Telegraph Media Group Limited, The Telegraph: Technology, Jan. 15, 2016. Web. Mar. 22, 2017. <http://www.telegraph.co.uk/technology/2016/01/21/affective-computing-how-emotional-machines-are-about-to-take-ove/>.
Kirby et al., "Affective Social Robots". Elsevier B.V., Robotics and Autonomous Systems 38 (2010), pp. 322-332.
Boccanfuso et al., "Autonomously Detecting Interaction With an Affective Robot to Explore Connection to Developmental Ability". IEEE Computer Society, 2015 International Conference on Affective Computing and Intelligent Interaction (ACII), Sep. 21-24, 2015.
Scheutz et al., "Toward Affective Cognitive Robots for Human-Robot Interaction". American Association for Artificial Intelligence, Proceedings of the 20th National Conference on Artifical Intelligence (2005), vol. 4, pp. 1737-1738.
Delaborde et al., "Affective Links in a Child-Robot Interaction". In proc. of the International Workshop on Corpora for Research on Emotion and Affect. LREC, Valletta, Malta. May 2010.
Samani et al., "A Mutlidisciplinary Artifical Intelligence Model of an Affective Robot". International Journal of Advanced Robotic Systems, vol. 9, 6: 2012.
Lilia V. Moshkina, "An Integrative Framework of Time-Varying Affective Robotic Behavior". A Dissertation Presented to the Academic Faculty of Georgia Institute of Technology, May 2011.
Roning et al., "Minotaurus: A System for Affective Human-Robot Interaction in Smart Environments". Cognitive Computation, Dec. 2014, vol. 6, Issue 4, pp. 940-953.
Nadia Berthouze, "COMPM082—Affective Computing and Human-Robot Interaction Syllabus". University College London, Department of Computer Science, Dec. 13, 2016. Web. Mar. 22, 2017. <http://www.cs.ucl.ac.uk/students/syllabus/undergrad/m082_affective_computing_and_human_robot_interACTION/>.
R. W. Picard, "Affective Computing". M.I.T. Media Laboratory Perceptual Computing Section Technical Report No. 321 (1995), p. 1-16.

* cited by examiner

ROBOTIC PHYSICAL MOVEMENT ADJUSTMENT BASED ON USER EMOTIONAL STATE

TECHNICAL FIELD

The present invention relates to the field of robotics, and particularly to robots that are capable of performing work activities. Still more particularly, the present invention relates to dynamically controlling a robotic device according to a robot-detected mood and/or emotion of a proximate human.

SUMMARY

In an embodiment of the present invention, a method controls a robot. One or more processors receive sensor readings from one or more sensors that are monitoring a human in real time, where the human is currently observing a robotic action by a robot, and where the robotic action is a physical movement performed by the robot. The processor(s) determine a cognitive state of the human while the human is observing the robotic action by the robot, and then adjust the robotic action being performed by the robot based on the cognitive state of the human.

In an embodiment of the present invention, a robot includes: a sensor receiver for receiving sensor readings from a set of one or more sensors that detect a cognitive state of a human that is currently observing a robotic action by a robot, where the robotic action is a physical movement performed by the robot; an instruction receiver for receiving a computer-executable program for causing the robot to modify the robotic action based on the cognitive state of the human; and a robotic controller processor for executing the computer-executable program in order to modify the robotic action.

Alternative embodiments of the present invention may also be implemented as a method, a computer program product and/or a robotic device if described above in another embodiment.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Robots are becoming more and more ubiquitous in modern society. Such robots may be rudimentary self-propelled vacuum cleaners that move autonomously, to self-controlled autonomous flying drones that perform functions such as taking photographs, to robots that have a human like appearance and perform services such as performing various types of household chores. However, human interactions with robots at times cause the humans to be uncomfortable, especially if the operations and movements of the robots are unpredictable. That is, if a human is first encountering a robot, and is not familiar with how it moves and operates, then any sudden movement (e.g., traveling from one point to another or moving a part of the robot such as a manipulator arm) may be disconcerting. As such, the present invention is directed to a system that 1) detects that a human who is observing a robot (either locally or remotely in various embodiments) is showing signs of distress, and then 2) modifies how the robot is moving, operating, functioning, etc. This leads to an improved robot that is better suited for interacting with or operating near humans.

In one more embodiments of the present invention, a robot determines (understands) a mental state, emotion and stress of observing humans based on one or more of the following technologies:

Analysis of Speech Patterns.

In this embodiment, the robot is equipped with a microphone that captures speech patterns of a user. This analysis may simply be a speech-to-text generation that converts spoken words to digitized text. For example, the human may say "I am nervous", which lets the robot know the current emotional state of the user. This phrase does not include an instruction to the robot, however. That is, the present invention is not directed to the robot performing a change in operations (e.g., shutting down) merely in response to an instruction from the user ("Robot, shut down now"). Rather, the text is interpreted solely for the purpose of determining an emotional state of the user, which leads the robot to adjust its operation.

In a preferred embodiment, however, the analysis of speech patterns is not to interpret the meaning of the spoken words of the user, but rather to interpret the current emotional state of the user based on speech patterns, inflection, volume, etc. For example, if the user simply starts screaming a sound (but not any words), then the speech pattern analysis will interpret this scream as being indicative of the user being very afraid.

Various types of speech pattern analysis are known to those skilled in art of speech pattern analysis, including advanced natural language processing, etc.

Facial Recognition Analytics.

In this embodiment, the robot is equipped with a camera, which is able to capture still or video images of the user/person. For example, assume that the camera has captured an image of the face of the user. Facial analysis software (either on-board the robot or in a monitoring system external to the robot) will assigns reference points to the facial image. The location of such points, relative to one another, are then interpreted by the facial recognition analytics program as being indicative of emotions such as fear, calm, surprise, etc., thereby providing a good indicator of the mood of the user.

On-body Human Stress Biomarkers.

In this embodiment, the robot is able to receive biometric sensor readings from biometric sensors worn by the user (e.g., as part of a wearable bracelet, wearable clothing, etc.). Such biometric sensors will detect heartrate, respiratory rate, sweating, changes in body temperature, etc., and generate biometric sensor signals that describe these user features. The robot receives these biometric sensor signals from the biometric sensors, and may interpret them in order to establish the mood (calm, anxiety, etc.) of the user.

Thermal Imaging.

In this embodiment, the robot (or a monitoring system) has a remote thermometer (e.g., an infrared detector that is able to capture infrared radiation being emitted from the user's face) to remotely capture the temperature of the user's face. If there is a change in the temperature of the user's face (e.g., gets warmer by being flushed by increased blood flow), then the robot may determine that the user is anxious.

Thus, the robot uses a deep learning algorithm (e.g., a heuristic process in which the robot "learns" from past experiences, data readings, etc.) to modify, either reactively to a detection of a mood of a user or proactively to a detection of a presence of a particular user) to modify its behavior. That is, if the robot detects (using one or more of the technologies described above to determine the mental state, emotion and stress of the user) that the user is anxious, then it will react by slowing down its movements, slowing down its computer-generated speech, etc. In an embodiment, when the robot merely detects that a particular user is watching the robot (either locally or via a remote video feed), and the robot "knows" that robots make the particular user nervous, then the robot adjusts its operation (e.g., slows down).

Thus, the present invention controls a robotic response/movement/operation based on a decoding of human emotions. The robot learns about the human(s) in the room and takes action based on a determination/decoding of emotions displayed by the human(s). Technologies used to decode emotion may include, but are not limited to, speech analysis, facial expression analysis, thermal analysis and on-body stress biomarkers.

As such and in one or more embodiments of the present invention, a system controls a robot based on the cognitive state(s) of user(s). Sensor devices and software on a processor determine a current cognitive state (e.g., fear, calm, etc.) associated with at least one human. The processor, which is connected to sensor devices, determines the cognitive state of the humans and, based on a model with advanced machine learning (e.g., a model of how the robot should move based on the presence of certain types of proximate humans), takes an action based on the cognitive state of the humans. For example, the model with advanced machine learning knows that if the robot is near a user who is nervous, then the robot should move slowly. However, the model also knows that if the robot is near a user who is very calm (e.g., based on having been around the robot in the past, and thus knowing what the robot is capable of), then the robot may move quickly, thus improving its functionality (e.g., rapidly perform its tasks).

In an embodiment of the present invention, the processor(s) detect the cognitive state of the human user from an analysis of the facial expression of the human user.

In an embodiment of the present invention, the processor(s) determine the cognitive state of the human user based on the analysis of speech patterns with advanced natural language analytics.

In an embodiment of the present invention, the processor(s) determine the cognitive state of the human user based on the analysis of on-body wearable human stress biomarkers.

In an embodiment of the present invention, the processor(s) determine the cognitive state of the human user based on the analysis of thermal imaging of the face to detect blood flow movement that is not expressed via muscles.

In an embodiment of the present invention, once the robot (or alternatively a monitoring system) determines the cognitive state of the human user, the processor(s) change the speed of the robot and/or the distance between the robot and the human user based on the human cognitive state. That is, the processor(s) direct the robot to 1) slow down and/or 2) move away from the human user if the human user is determined to be anxious.

In an embodiment of the present invention, the robot adjusts audiovisual outputs based on an emotional threshold level of the human user. For example, if it is determined that the human user is anxious at a level that goes beyond merely paying attention to the robot, and the robot has a video display for presenting visual information and/or a speaker for creating speech, music, etc., then the brightness and/or sounds level of the display and speaker (respectively) are turned down, in order to calm the human user.

Figure 1:
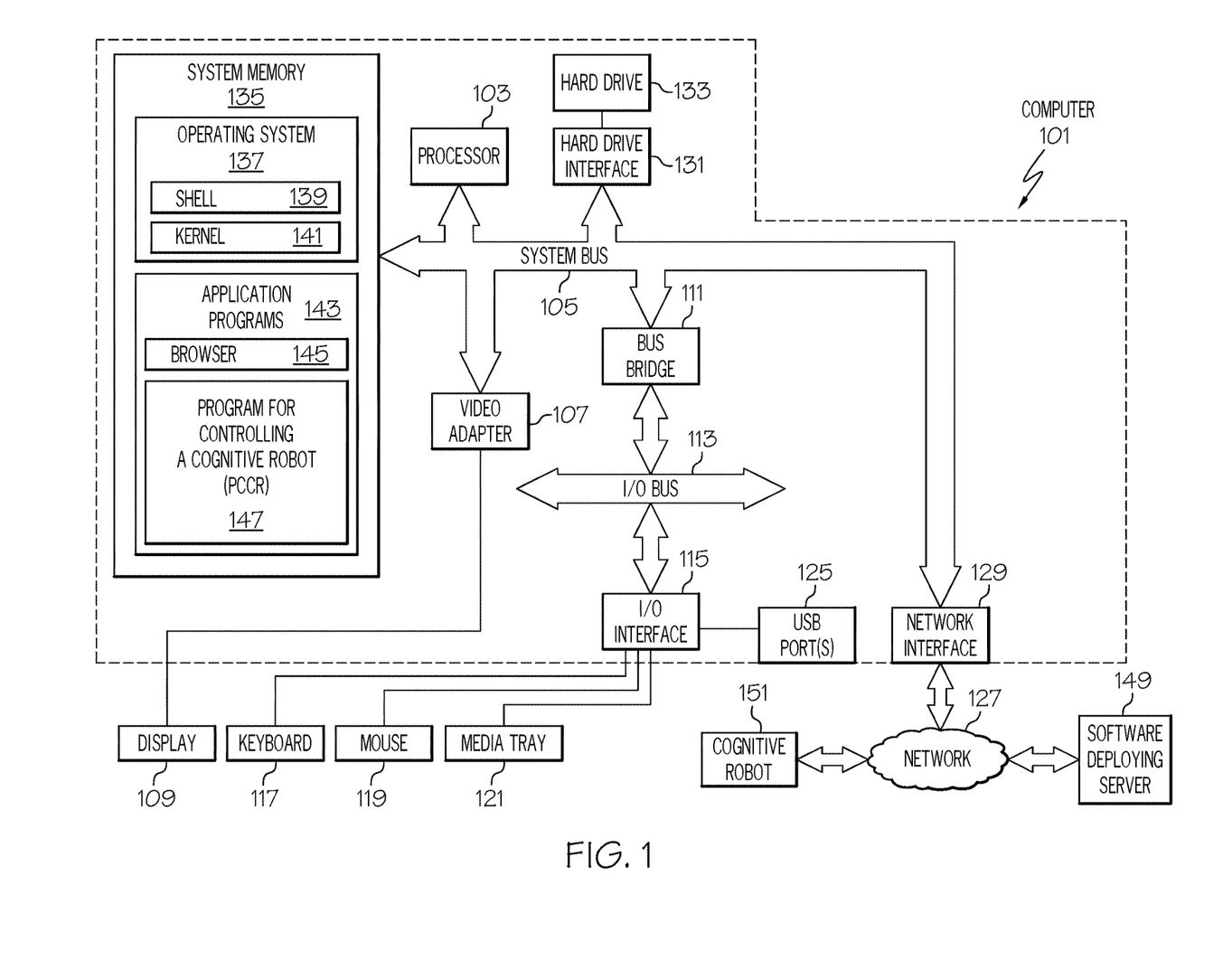
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a cognitive robot 151 shown in FIG. 1, and/or robot controller processor 203 shown in FIG. 2, and/or a robot monitoring system 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network interface 129 may include a wireless transceiver that allows computer 101 to wirelessly communicate with other devices, such as cognitive robot 151, biosensors on a user, etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Controlling a Cognitive Robot (PCCR) 147. PCCR 147 includes code for implementing the processes described below, including those described in FIGS. 2-6. In one embodiment, computer 101 is able to download PCCR 147 from software deploying server 149, including in an on-demand basis, wherein the code in PCCR 147 is not downloaded until needed for execution. In one embodiment of the present invention, software deploying server 149 performs all of the functions associated with the present invention (including execution of PCCR 147), thus freeing computer 101 from having to use its own internal computing resources to execute PCCR 147.

Cognitive robot 151 is an autonomous robot, which may be land, air, or water-based, that is able to 1) move and function autonomously, and 2) modify its movement and operations based on the current cognitive state (e.g., fear, anxiety, etc.) of a user who is observing the cognitive robot 151. The cognitive robot 151 is able to dynamically modify how it responds to users who are currently (or have a history of) experiencing certain cognitive states. For example, if cognitive robot 151 detects a nearby human who is showing signs of being anxious (a user who is currently experiencing the cognitive state of anxiety), then the robot modifies its behavior by slowing down (dynamically modifies how it responds to the user).

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
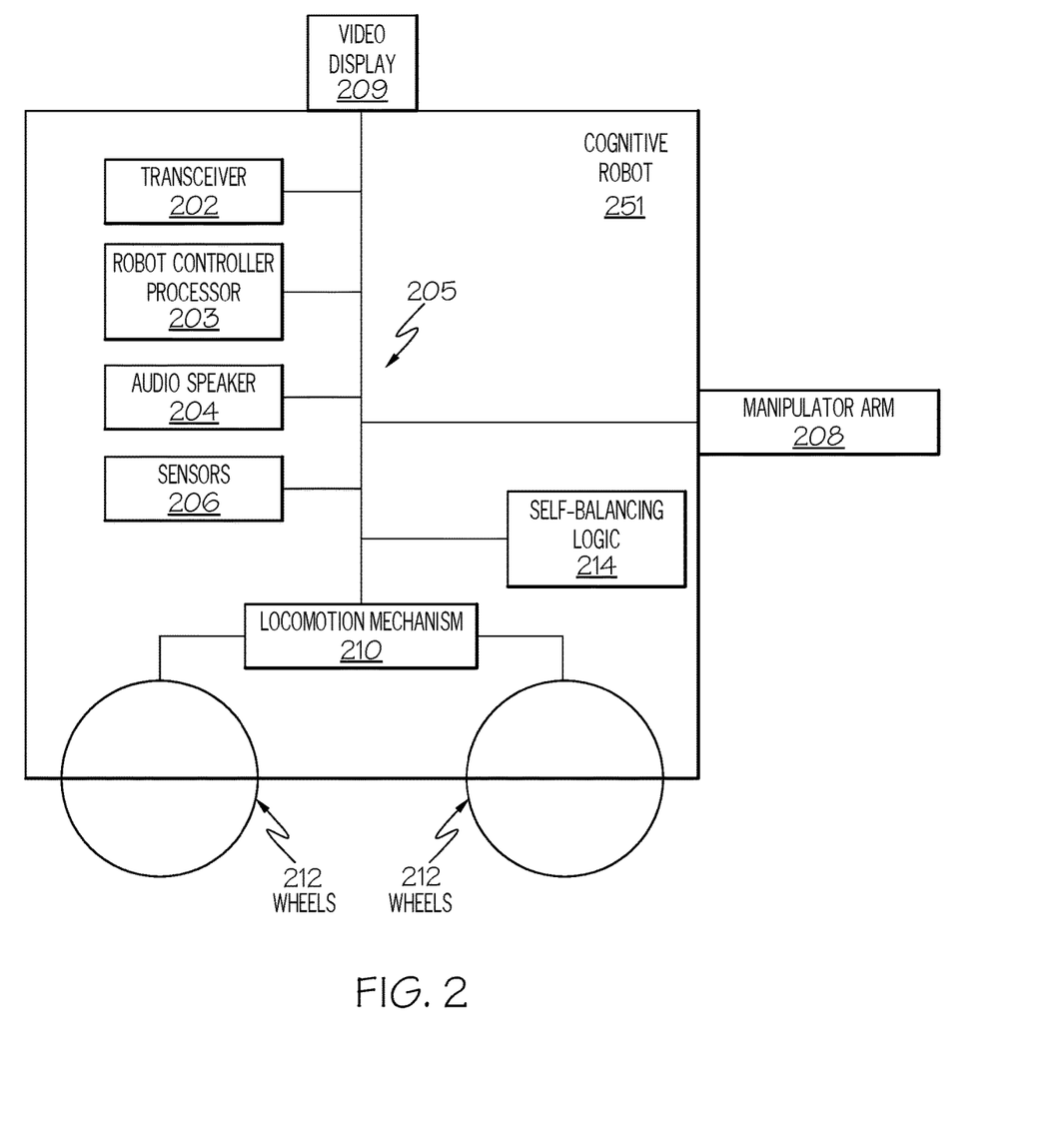
FIG. 2 illustrates an exemplary robot in accordance with one or more embodiments of the present invention.

With reference now to FIG. 2, a block diagram of an exemplary cognitive robot 251 (analogous to the cognitive robot 151 shown in FIG. 1) is depicted in accordance with one or more embodiments of the present invention.

Cognitive robot 251 is an autonomous physical robot that is not controlled by the person manipulating a joystick or other controller. That is, the cognitive robot 251 does not move left or right or forward or backward in response to the person manipulating a controller (e.g., a joystick on a radio transmitter). Rather, the cognitive robot 251 moves according to a cognitive state of a human observer.

Additional detail of how the cognitive robot 251 moves is described below. First, however, an exemplary cognitive robot 251 is presented in a block description of functional components in FIG. 2.

As shown in FIG. 2, the cognitive robot 251 includes a robot controller processor 203, which is analogous to processor 103 shown in FIG. 1. Processor 203 is electrically coupled to a bus 205 (analogous to system bus 105 and/or I/O bus 113 shown in FIG. 1).

Also coupled to the bus 205 is a transceiver 202, which is able to transmit and receive (transceiver) wireless signals. For example, transceiver 202 is able to receive a video feed of a person who is at a location (e.g., of their face or their environment). Similarly, transceiver 202 is able to receive instructions from a remote controlling system, such as robot monitoring system 301 shown in FIG. 3.

Also coupled to bus 205 is an audio speaker 204, which can emit audio content such as computer-generated speech, pre-recorded music, etc.

Sensors 206 are sensors that detect an environment around the cognitive robot 251, including both general areas and spaces to be occupied in the environment and also objects to be avoided. For example, one or more of the sensors 206 may be a still or video digital camera, whose images are interpreted by robot controller processor 203 to adjust the movement of the cognitive robot 251.

In another embodiment, one or more of the sensors 206 may be a chemical detector, which is able to detect a particular chemical, smell, odor, etc. using known scent detectors, such as an electronic nose that uses a metal-oxide semiconductor (MOSFET) transistor that amplifies electronic signals generated by conducting organic polymers, polymer composites, and/or a quartz crystal resonator that create a unique signal indicative of a particular airborne element, which detect a characteristic scent of a human who is watching the cognitive robot 251.

In another embodiment, one or more of the sensors 206 may be a sound detector (e.g., a microphone), which generates a digital signal that can be qualified to identify a particular device, unit of machinery, personal voice, etc. by comparing the digital signal to a known database of captured and digitized sounds (e.g., using a fast Fourier transform—FFT analysis).

Therefore, one or more of the sensors 206 may be used not only to identify the environment of the cognitive robot 251 (e.g., the interior of a room in which a cognitive robot 251 is located), but also to facilitate the ability of the cognitive robot 251 to negotiate around obstacles and/or structures within the local environment.

Also coupled to the bus 205 is a manipulator arm 208, which is a physical device that can interact with a physical object. For example, manipulator arm 208 may be a set of mechanical arms that are able to lift an object, open a door, turn on a switch, etc. using a set of gears, pulleys, motors, etc. In another embodiment, manipulator arm 208 is a device that is able to interact with a device in a non-touching way. For example, such as device may be a liquid cannon that is able to disarm a dangerous device by spraying water or another liquid agent onto a device in order to render it inert (e.g., extinguishing a fire).

Also coupled to the bus 205 is a locomotion mechanism 210 that is able, under the direction of the processor 203 using signals generated by the sensors 206 and/or other information about an observer (e.g., user 303 shown in FIG. 3), to direct electro-mechanical components of the locomotion mechanism 210 to move and steer the cognitive robot 251 (e.g., by rolling and steering wheels 212). In a preferred embodiment, cognitive robot 251 includes a self-balancing logic 214, which includes accelerometers, gravity detectors, etc. that cause the locomotion mechanism 210 to keep the cognitive robot 251 in an upright position, even though it may be balanced on only two wheels (or even one ball) or two appendages (e.g., "legs"). This embodiment allows the cognitive robot 251 to have a physical appearance that emulates that of a human person. However, in various embodiments, any means of locomotion including powered treads, powered tracks, powered spheres, powered multiple wheels, steering jets or other propellant-based steerage systems, etc., are within the scope of the present invention.

Figure 3:
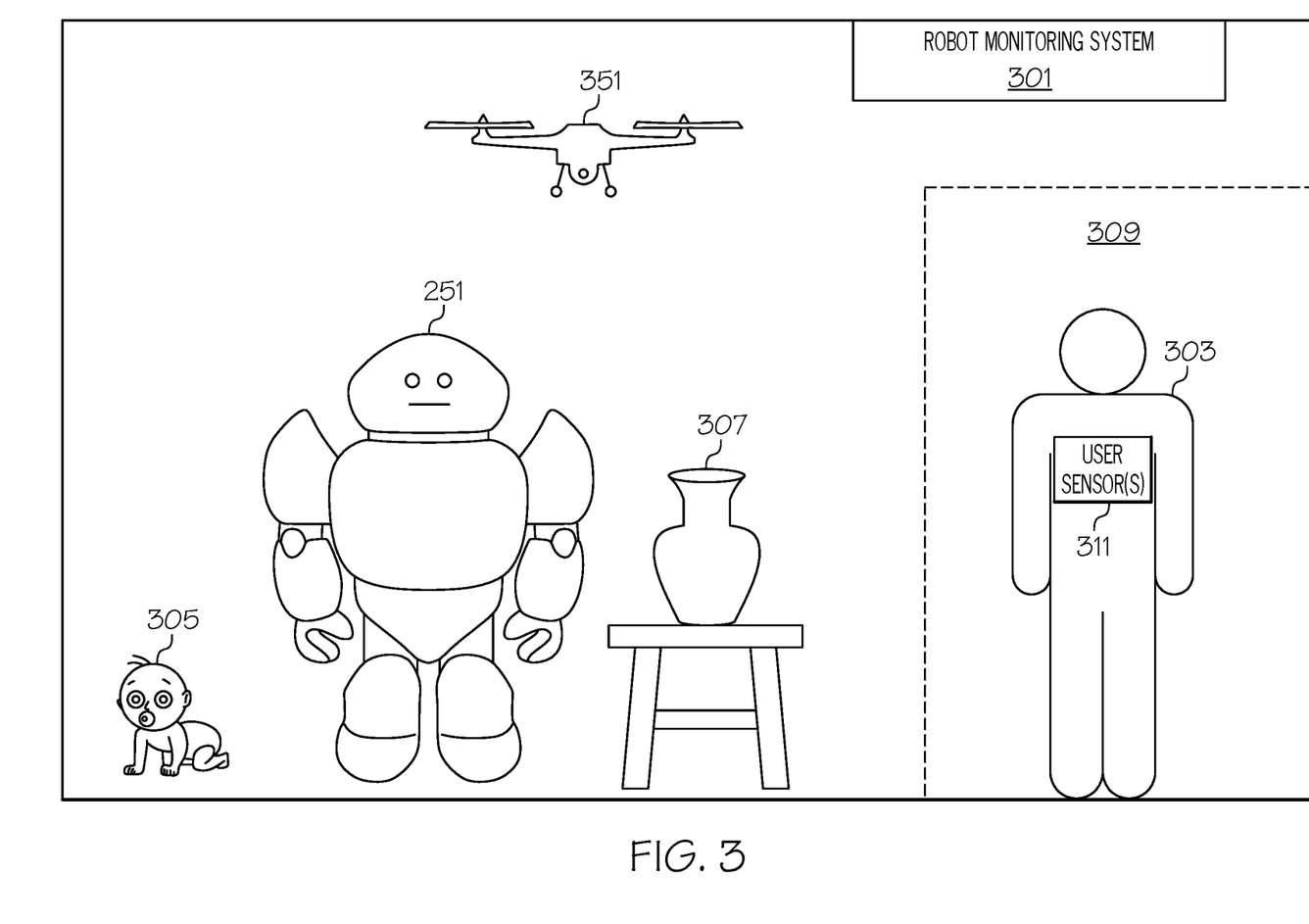
FIG. 3 depicts an exemplary interaction between a robot and a human in accordance with one or more embodiments of the present invention.

With reference now to FIG. 3, assume that a user 303 is watching the cognitive robot 251 operate. Assume further, however, the user 303 is not very familiar with the capabilities and/or limitations of the cognitive robot 251. Thus, if the cognitive robot 251 were to move too close to (or too quickly towards) an infant 305 or a valuable vase 307, then the user 303 may become anxious. User sensor(s) 311, such as biometric sensors that detect the heartrate, respiratory rate, etc. of the user 303, may send biometric sensor signals to a receiver (e.g., transceiver 202 shown in FIG. 2) within the cognitive robot 251, which provides the robot controller processor 203 with input data that causes the robot controller processor 203 to 1) determine that user 303 is anxious, and 2) direct the locomotion mechanism 210 to slow down, move away from the infant 305, etc.

Similarly, if the cognitive robot 251 is using the manipulator arm 208 to perform an action (e.g., picking up the valuable vase 307), and the robot controller processor 203 determines that the user is getting anxious while watching the cognitive robot 251 perform this operation, then the robot controller processor 203 will direct the manipulator arm 208 to move more slowly, even though the manipulator arm is engineered for (and is capable of) picking up the valuable vase 307 in a manner that is very fast, and yet does not damage the valuable vase 307. These operations (of dynamically modifying the operation of cognitive robot 251 based on the cognitive state of the user 303) alternatively may be performed by robot monitoring system 301, which tracks the movement of the cognitive robot 251, the movement of the user 303, the position of the infant 305, etc. using positioning logic (e.g., GPS sensors) or visual images (captured by robot monitoring system 301) of such persons/objects/devices.

Also shown in FIG. 3 is an aerial drone 351, which is a flying version of cognitive robot 251. Aerial drone 351 will include most features shown in FIG. 2 for cognitive robot 251, along with additional features (known to those skilled in the art of autonomous drones) for navigation, hovering, flying, etc.

With continued reference to FIG. 3, assume that user 303 becomes nervous not only if the cognitive robot 251 gets too close or moves too quickly towards a particular entity (e.g., infant 305 or valuable vase 307), but may also become nervous if the cognitive robot gets too close to a certain area. For example, assume that area 309 is a restricted area, such as a research laboratory. Thus, if the cognitive robot 251 moves to enter area 309, with user 303 being in area 309 or with user 303 not being in area 309, the user may become nervous/angry/etc. The cognitive robot 251 will detect this nervous/angry/etc. cognitive state of the user 303, and will move away from area 309. The cognitive robot 251 (and/or the robot monitoring system 301) are able to classify a functional type for area 309 using a visual analysis of digital photographic images captured by a camera within the cognitive robot 251 and/or the robot monitoring system 301.

Figure 4:
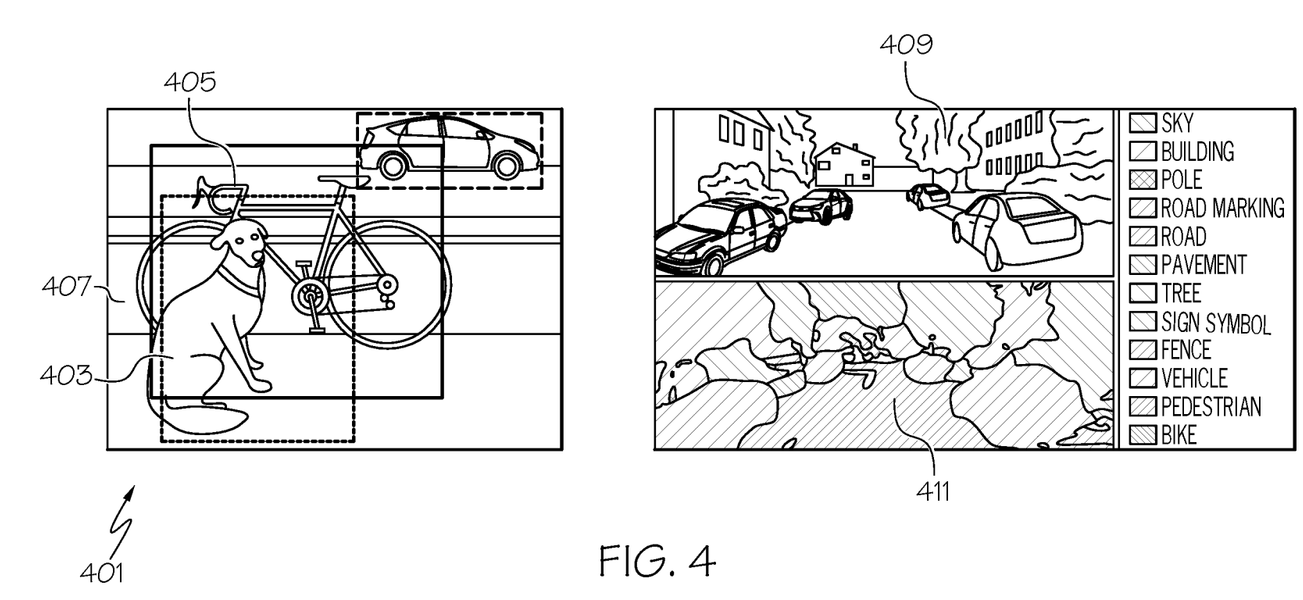
FIG. 4 illustrates an exemplary process for defining an area type in accordance with one or more embodiments of the present invention.

With reference now to FIG. 4, two alternative embodiments for classifying a functional area are presented. As shown in image 401, an image may be segmented into multiple objects, which together define a particular functional area according to an object-level area segmentation. For example, assume that image recognition software identifies a pet 403, a bicycle 405, and a railing 407 in image 401. The system will then identify the functional area depicted in the image 401 as being a balcony, based on the items found in the image 401. Assuming that the cognitive robot 251 has been programmed to avoid going onto the balcony (area 309) when the user 303 is anxious, then the cognitive robot 251 will avoid the balcony during those times.

Alternatively, a semantic pixel-wise segmentation can transform an image 409 into color-coded groups of pixels shown in image map 411, which is a digital image that is examined in order to identify the buildings, cars, street, etc. in the image. As such, the image 409 is identified as a functional area "street". Assuming that the cognitive robot 251 has been programmed to avoid going onto the "street" (area 309) when the user 303 is anxious, then the cognitive robot 251 will avoid the "street" during those times.

Figure 5:
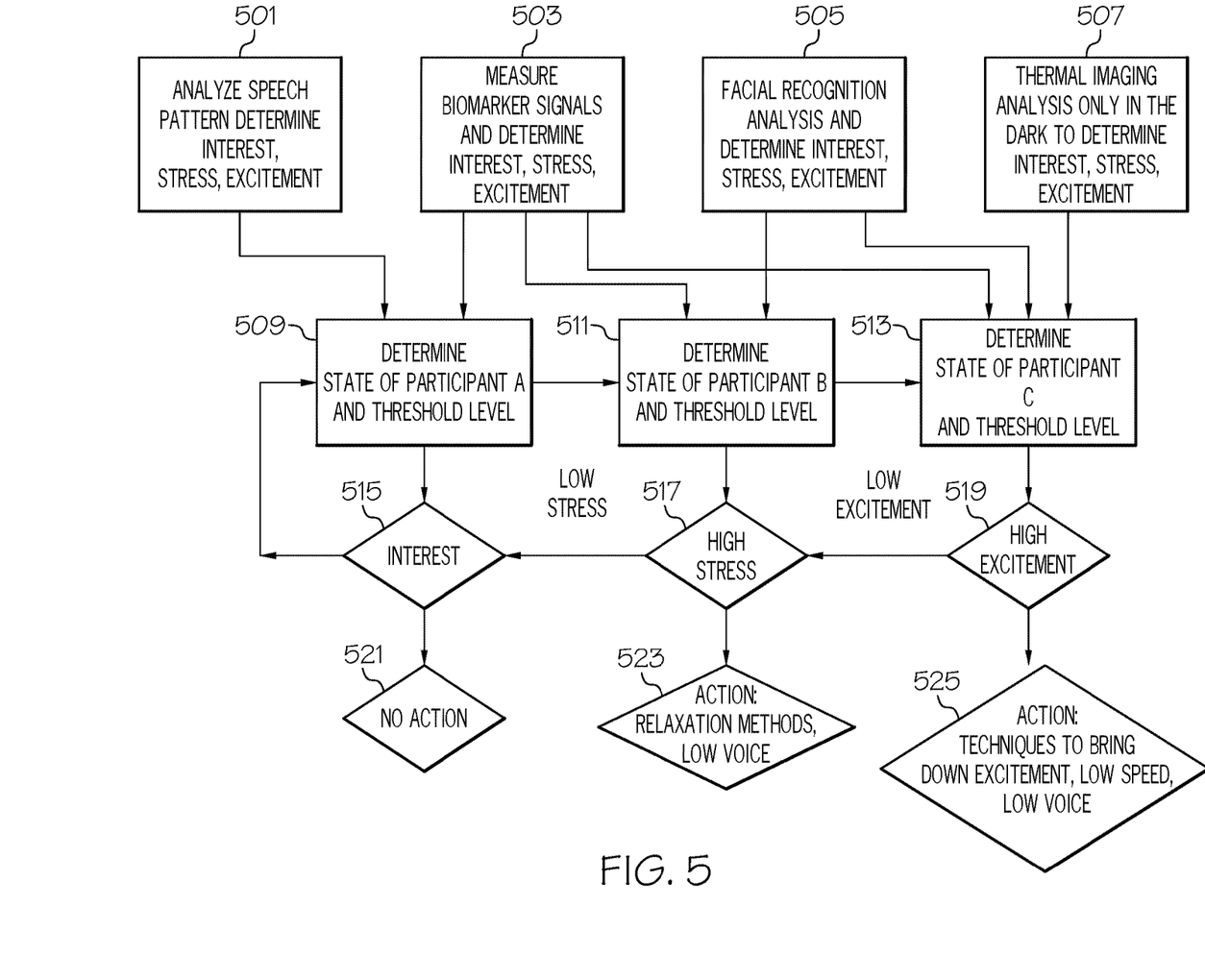
FIG. 5 depicts a high-level overview of one or more embodiments of the present invention.

With reference now to FIG. 5, a high level overview of one or more embodiments of the present invention is presented. As shown in blocks 501, 503, 505, and 507, the cognitive robot 251 and/or the aerial drone 351 and/or the robot monitoring system 301 will take cognition readings of the user 303 using speech analysis (block 501), biometric markers (block 503), facial recognition (block 505), and/or thermal imaging (block 507).

As shown in blocks 509, 511, and 513, a determination is made as to whether one or more persons ("Participants A, B, C") are experiencing a cognitive state (e.g., anxiety) that is above a predefined threshold level. If not (query block 515), then no action is taken (block 521). However, if a particular user is experiencing a high level of excitement (query block 519), this will lead to actions by the cognitive robot to reduce the excitement level of the user (block 525). Similarly, if the user is determined to be showing signs of high stress (query block 517), then the cognitive robot will take steps to reduce this stress (block 523). Stress and excitement are similar, but manifest themselves in the user differently. For example, a user may be excited to watch how capable and efficient the cognitive robot is, but such constant excitement may not be healthy, and thus the cognitive robot will perform some relaxing actions (e.g., play soft music). However, if the user is showing signs of true fear (stress), then the cognitive robot will perform more dramatic actions (e.g., slowing itself down), in order to calm this user down.

Figure 6:
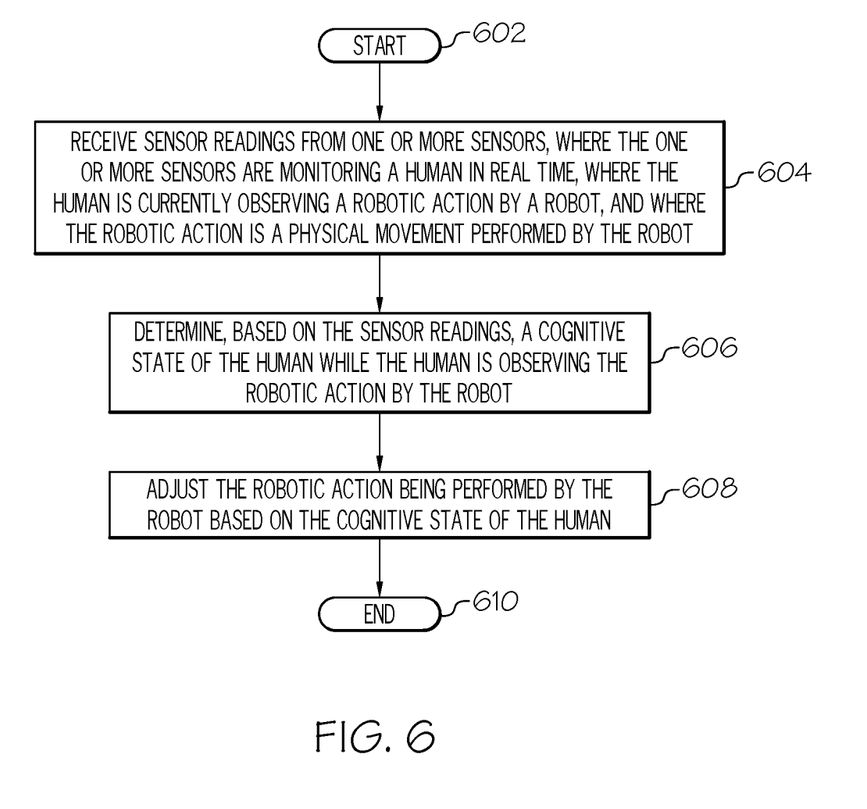
FIG. 6 is a high-level flow chart of one or more steps performed by one or more processors and/or other hardware devices in accordance with one or more embodiments of the present invention.

With reference now to FIG. 6, a high level-overview of one or more steps performed by one or more processors and/or other hardware devices to control a cognitive robot is presented.

After initiator block 602, one or more processors (e.g., robot controller processor 203 and/or a processor 103 within robot monitoring system 301) receive sensor readings from one or more sensors, as described in block 604. These one or more sensor(s) may be a microphone, camera, chemical sensors, etc. within the cognitive robot 251 or may be within the robot monitoring system 301 shown in FIG. 3. In either case, they monitor a human (e.g., user 303) in real time, and more specifically they monitor the cognitive state of the human in real time. As described herein the human is currently observing (in person or via a remote video feed) a robotic action by a robot. The robotic action is a physical movement performed by the robot, such as locomotion (rolling on wheels 212 shown in FIG. 2), moving a manipulator arm 208, etc.

As described in block 606, the processor(s) determine, based on the sensor readings, a cognitive state of the human while the human is observing the robotic action by the robot.

As described in block 608, the processor(s) adjust the robotic action being performed by the robot based on the cognitive state of the human.

The flow chart ends at terminator block 610.

As described herein and in various embodiments of the present invention, one or more processor(s) adjust the physical movement performed by the robot by changing a speed of the physical movement. For example, the locomotion speed of the cognitive robot while moving from point A to point B may be slowed down (if the user is anxious) or sped up (if the user is calm).

Similarly, the type of movement may be altered. That is, assume that the cognitive robot is designed to make indirect movements, in order to keep itself more stable. For example, assume that the manipulator arm 208 is designed to reach for an object not by reaching directly for the object, but rather by moving first in one direction and then moving at a second direction. Thus, if the arm is at one apex of a triangle and the object that it is picking up is at another apex of the triangle, then rather than moving the arm directly towards the object (e.g., along the hypotenuse of the triangle), the arm will first move along an adjacent side of the triangle and then along an opposite side of the triangle. This may provide the benefit of allowing the arm to move more quickly towards the object, since there is no need to calculate the hypotenuse direction and length first. Rather, the arm moves along the known length of the adjacent side and then changes direction along the known length of the opposite side. However, this "two step" movement (along the two sides of the triangle) rather than a "one step" movement (along the hypotenuse) may frighten the observer, since he/she was expecting the arm to simply reach directly towards the object.

In an embodiment of the present invention, the robotic action is a physical locomotion of the robot and the processor(s) adjust the physical locomotion to adjust a physical distance between the robot and the human based on the cognitive state of the human. For example, if the user becomes anxious due to the presence of the cognitive robot, then the cognitive robot will put more physical space between itself and the human.

In an embodiment of the present invention, the robotic action further includes a generation of a visual image on a display on the robot. The processor(s) adjust the visual image based on the cognitive state of the human. For example, if a display on the cognitive robot shows bright lights, and the user is showing signs of being anxious, then the display will be turned down in order to show more muted/dimmer lights.

In an embodiment of the present invention, the robotic action further includes a generation of a sound from a speaker on the robot. The processor(s) adjust the volume from the speaker (e.g., turn it down) based on the cognitive state of the human (e.g., anxiety).

In an embodiment of the present invention, one or more processors determine the cognitive state of the human based on a photo analysis of a photo of a facial expression of the human, where the facial expression of the human is indicative of the cognitive state of the human. That is, facial analysis of the photo describes how the user is currently feeling.

In an embodiment of the present invention, one or more processors determine the cognitive state of the human based on an analysis of a speech pattern of the human, where the analysis of the speech pattern is performed using advanced natural language analytics, and where the speech pattern is indicative of the cognitive state of the human, as described above.

In an embodiment of the present invention, one or more processors determine the cognitive state of the human based on biometric sensor readings from a set of biometric sensors (e.g., user sensor(s) 311 shown in FIG. 3) directed towards the human.

In an embodiment of the present invention, one or more processors determine the cognitive state of the human based on an analysis of thermal imaging of a face of the human, where the thermal imaging detects a blood flow level in the human that is indicative of the cognitive state of the human. That is, if the user's face is flushed (as detected by an infrared sensor in the cognitive robot), then the cognitive robot will determine that the user is anxious or angry.

In an embodiment of the present invention, one or more processors modify the robotic action based on heuristic machine learning by the robot, where the heuristic machine learning causes the robot to learn about an environment of the robot in order to adjust the robotic action. That is, if the cognitive robot 251 detects that user 309 (or another user) always becomes agitated when the cognitive robot 251 approaches the valuable vase 307 shown in FIG. 3, then the cognitive robot 251 learns to stay away from the valuable vase 307, even though it is engineered to be able negotiate around and/or interact with (e.g., pick up) the valuable vase 307 without incident.

In an embodiment of the present invention, one or more processors detect that the cognitive state of the human has reached a threshold level, and then further adjust the robotic action based on the cognitive state of the human reaching the threshold level. For example, assume that the cognitive robot 251 first determines that user 309 is slightly concerned while the cognitive robot 251 is picking up the valuable vase 307 shown in FIG. 3. As such, the cognitive robot 251 will put the valuable vase 307 back down but will remain next to the valuable vase 307. However, the cognitive robot 251 then detects that the user 303 is becoming even more anxious now (the "cognitive state of the human" has reached the "threshold level"). As such, the cognitive robot will then move away from the valuable vase 307 ("further adjust the robotic action").

In an embodiment of the present invention, one or more processors receive location sensor readings from one or more location sensors, where the location sensor readings describe a type of physical location in which the human is located; detect that the robot is within the type of physical location in which the human is located; determine that a presence of the robot within the type of physical location in which the human is located is affecting the cognitive state of the human being; and in response to determining that the robot is within the type of physical location in which the human is located and in response to determining that the presence of the robot within the type of physical location in which the human is located is affecting the cognitive state of the human being, direct the robot to leave the type of physical location in which the human is located. For example, if the user 303 in a secure area (area 309 shown in FIG. 3), and the cognitive robot enters that area, the user may become anxious. The cognitive robot 251 detects this change in the cognitive state of the user, and leaves the area 309.

In an embodiment of the present invention, one or more processors detect, based on positioning sensor readings from one or more positioning sensors, that the robot is within a predefined distance of an object that has been predetermined by the human to be delicate, and then direct the robot to move away from the object by more than the predefined distance. For example, if the cognitive robot 251 being within two feet of the valuable vase 307 makes the user 303 anxious, then the cognitive robot 251 is directed to keep at least two feet of space between itself and the valuable vase 307.

In an embodiment of the present invention, the robot includes a mechanical manipulator arm (e.g., manipulator arm 208 shown in FIG. 2). One or more processors detect, based on positioning sensor readings from one or more positioning sensors, that the robot is within a predefined distance of an object that has been predetermined by the human to be delicate, and then prevent the robot from moving the mechanical manipulator arm while the robot is within the predefined distance from the object. For example, whenever the cognitive robot 251 comes within two feet of the valuable vase 307, the robot controller processor 203 will disable the manipulator arm 208, such that it cannot reach for or inadvertently strike the valuable vase 307 when the cognitive robot passes by the valuable vase.

In an embodiment of the present invention, a robot (e.g., cognitive robot 251 shown in FIG. 2) includes a sensor receiver (e.g., transceiver 202) for receiving sensor readings from a set of one or more sensors (e.g., sensors 206 and/or user sensor(s) 311 shown in FIG. 3) that detect a cognitive state of a human (e.g., user 303) who is currently observing a robotic action by a robot, wherein the robotic action is a physical movement performed by the robot. An instruction receiver (also transceiver 202) receives a computer-executable program for causing the robot to modify the robotic action (e.g., a physical movement) based on the sensor readings that describe the cognitive state of the human. A robotic controller processor (e.g., robotic controller processor 203 shown in FIG. 2) executes the computer-executable program in order to modify the robotic action (e.g., by manipulating the locomotion mechanism 210 and/or the manipulator arm 208 shown in FIG. 2).

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
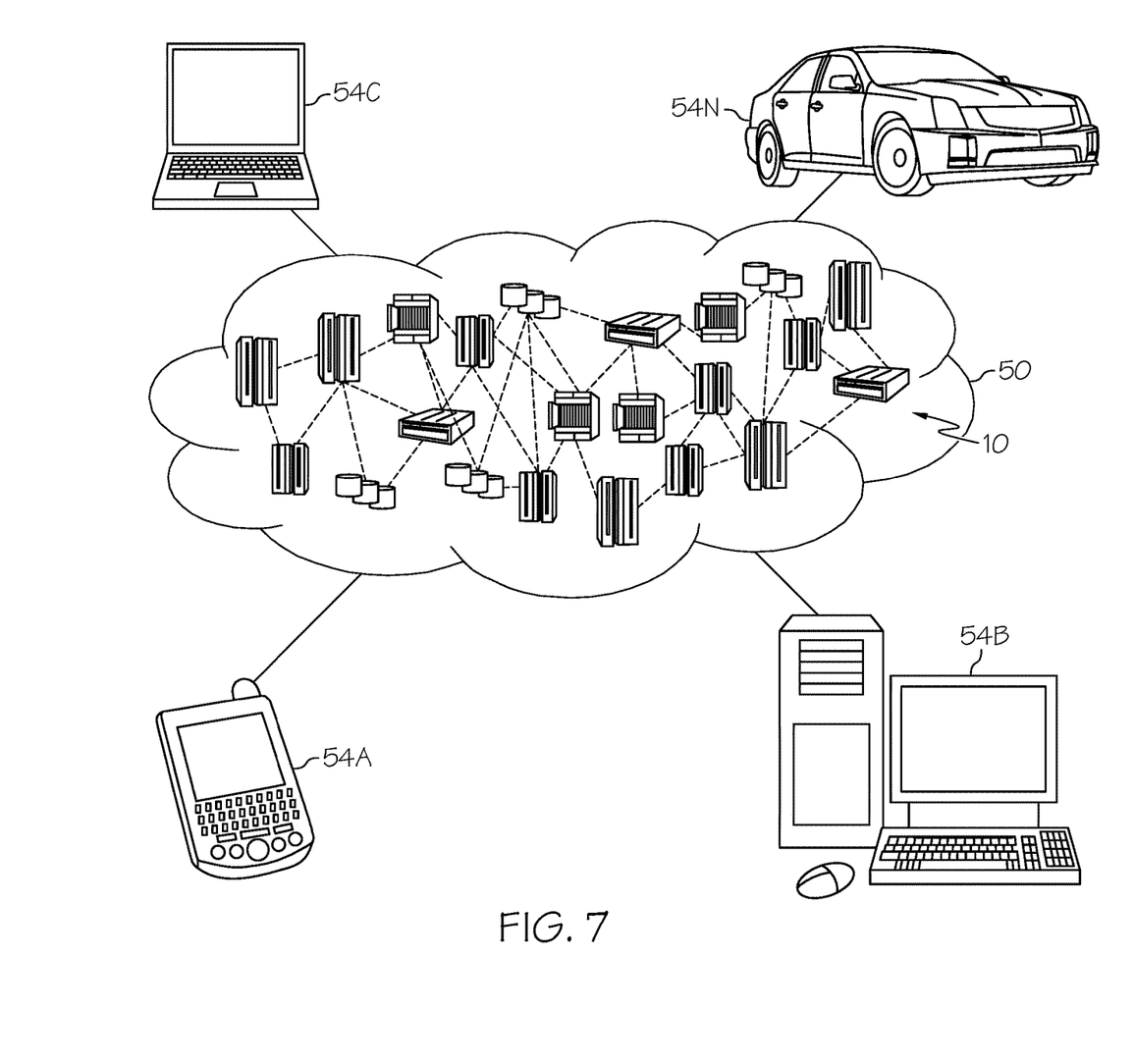
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
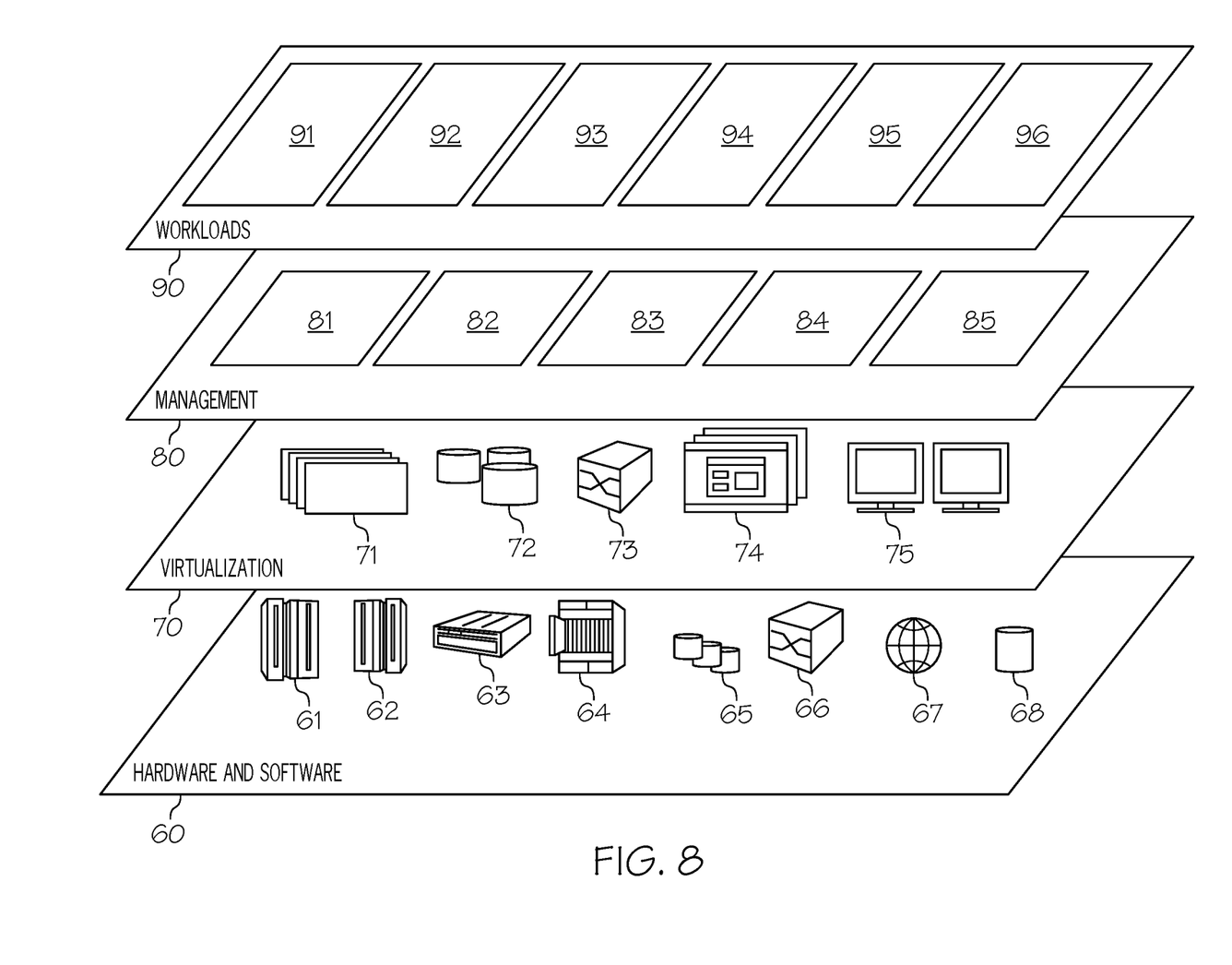
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive robot control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method comprising:
  receiving, by one or more processors, sensor readings from one or more sensors, wherein the one or more sensors are monitoring a human in real time, wherein the human is currently observing a robotic action by a robot, wherein the robotic action is a physical movement performed by the robot;
  determining, by one or more processors and based on the sensor readings, an emotional state of the human caused by the human observing the robotic action by the robot, wherein the emotional state of the human is fear; and in response to determining, by one or more processors and based on the sensor readings, that the emotional state of the human caused by the human observing the robotic action by the robot is fear, reducing, by one or more processors, a velocity of movements made by the robot while performing a physical task.

2. The processor-implemented method of claim 1, wherein the robotic action is a physical locomotion of the robot, and wherein the processor-implemented method further comprises:

adjusting, by one or more processors, the physical locomotion of the robot to increase a physical distance between the robot and the human based on the emotional state of the human.

3. The processor-implemented method of claim 1, wherein the robotic action further comprises a generation of a visual image on a display on the robot, wherein the human is viewing the visual display on the robot, and wherein the processor-implemented method further comprises:

adjusting, by one or more processors, the visual image on the display on the robot based on the emotional state of the human that is viewing the visual display on the robot.

4. The processor-implemented method of claim 1, wherein the robotic action further comprises a generation of a sound from a speaker on the robot, and wherein the processor-implemented method further comprises:

adjusting, by one or more processors, a volume level of the sound from the speaker based on the emotional state of the human.

5. The processor-implemented method of claim 1, further comprising:

detecting, by a chemical detector on the robot, a characteristic scent of the human; and identifying, by one or more processors, a presence of the human within a predefined distance of the robot based on the characteristic scent of the human that is detected by the chemical detector on the robot.

6. The processor-implemented method of claim 1, further comprising:

determining, by one or more processors, the emotional state of the human based on an analysis of a speech pattern of the human, wherein the analysis of the speech pattern is performed using advanced natural language analytics, and wherein the speech pattern is indicative of the emotional state of the human.

7. The processor-implemented method of claim 1, further comprising:

determining, by one or more processors, the emotional state of the human based on biometric sensor readings from a set of biometric sensors directed towards the human.

8. The processor-implemented method of claim 1, further comprising:

determining, by one or more processors, the emotional state of the human based on an analysis of thermal imaging of a face of the human, wherein the thermal imaging detects a blood flow level in the human that is indicative of the emotional state of the human.

9. The processor-implemented method of claim 1, further comprising:

modifying, by one or more processors, the robotic action based on heuristic machine learning by the robot, wherein the heuristic machine learning causes the robot to learn about an environment of the robot in order to adjust the robotic action.

10. The processor-implemented method of claim 1, further comprising:

identifying, by one or more processors, objects within an area;

identifying, by one or more processors, a type of area of the area based on the objects identified within the area;

determining, by one or more processors, that the robot is prohibited from operating in the identified type of area; and in response to determining that the robot is prohibited from operating in the identified type of area, blocking, by one or more processors, the robot from being in the area.

11. The processor-implemented method of claim 1, further comprising:

receiving, by one or more processors, location sensor readings from one or more location sensors, wherein the location sensor readings describe a type of physical location in which the human is located;

detecting, by one or more processors, that the robot is within the type of physical location in which the human is located;

determining, by one or more processors, that a presence of the robot within the type of physical location in which the human is located is affecting the emotional state of the human being; and in response to determining that the robot is within the type of physical location in which the human is located and in response to determining that the presence of the robot within the type of physical location in which the human is located is affecting the emotional state of the human being, directing, by one or more processors, the robot to leave the type of physical location in which the human is located.

12. The processor-implemented method of claim 1, further comprising:

detecting, by one or more processors and based on positioning sensor readings from one or more positioning sensors, that the robot is within a predefined distance of an object that has been predetermined to be delicate; and directing, by one or more processors, the robot to move away from the object by more than the predefined distance.

13. The processor-implemented method of claim 1, wherein the robot includes a mechanical manipulator arm, wherein the mechanical manipulator arm is engineered to lift an object that is away from the robot, and wherein the processor-implemented method further comprises:

detecting, by one or more processors and based on positioning sensor readings from one or more positioning sensors, that the robot is within a predefined distance of an object that has been predetermined to be delicate; and preventing, by one or more processors, the robot from moving the mechanical manipulator arm while the robot is within the predefined distance from the object.

14. The processor-implemented method of claim 1, wherein the human is observing, via a remote video feed, the robotic action of the robot at a location that is remote from a location of the robot.

15. The processor-implemented method of claim 1, wherein the physical movement performed by the robot is an initial movement, wherein the initial movement is a two step movement along two different directions that causes the robot to move indirectly towards an object, and wherein the adjusted robotic action is a one step movement along a single direction that causes the robot to move directly towards the object.

16. A robot comprising:
- a sensor receiver for receiving sensor readings from a set of one or more sensors that detect an emotional state of a human who is currently observing a robotic action by a robot, wherein the robotic action is a physical movement performed by the robot, wherein the emotional state of the human is fear, and wherein the emotional state of fear in the human is caused by the human observing the robotic action by the robot;
- an instruction receiver for receiving a computer-executable program for causing the robot to modify a velocity of the robotic action based on the sensor readings that describe the emotional state of the human; and
- a robotic controller processor for:
  - determining, based on the sensor readings, the emotional state of fear the human caused by the human observing the robotic action by the robot, and
  - executing the computer-executable program in order to modify the velocity of the robotic action in response to determining, based on the sensor readings, the emotional state of fear in the human caused by the human observing the robotic action by the robot, wherein the robotic controller processor modifies the velocity of the robotic action by reducing a velocity of movements made by the robot while performing a physical task.

17. The robot of claim 16, further comprising:
one or more processors configured to:
- receive location sensor readings from one or more location sensors, wherein the location sensor readings describe a type of physical location in which the human is located;
- detect that the robot is within the type of physical location in which the human is located;
- determine that a presence of the robot within the type of physical location in which the human is located is affecting the emotional state of the human being;
- in response to determining that the robot is within the type of physical location in which the human is located and in response to determining that the presence of the robot within the type of physical location in which the human is located is affecting the emotional state of the human being, direct the robot to leave the type of physical location in which the human is located.

18. A computer program product for controlling a robot, the computer program product comprising a non-transitory computer readable storage medium having program code embodied therewith, the program code readable and executable by a processor to perform a method comprising:
- receiving sensor readings from one or more sensors, wherein the one or more sensors are monitoring a human in real time, wherein the human is currently observing a robotic action by a robot, and wherein the robotic action is a physical movement performed by the robot;
- determining, based on the sensor readings, an emotional state of the human caused by the human observing the robotic action by the robot, wherein the emotional state of the human is fear; and
- in response to determining, based on the sensor readings, that the emotional state of the human caused by the human observing the robotic action by the robot is fear, reducing a velocity of movements made by the robot while performing a physical task.

19. The computer program product of claim 18, wherein the program instructions are provided as a service in a cloud environment.

* * * * *